US012612670B2

(12) United States Patent
Rabe et al.

(10) Patent No.: US 12,612,670 B2
(45) Date of Patent: Apr. 28, 2026

(54) DELIMING COMPOSITION AND METHOD FOR DELIMING HIDES

(71) Applicant: TFL Ledertechnik GmbH, Rheinfelden (DE)

(72) Inventors: Volker Rabe, leverkusen (DE); Susanne Döppert, Leverkusen (DE)

(73) Assignee: TFL Ledertechnik GmbH, Rheinfelden (DE)

( * ) Notice: Subject to any disclaimer, the term of this patent is extended or adjusted under 35 U.S.C. 154(b) by 507 days.

(21) Appl. No.: 18/272,704

(22) PCT Filed: Jan. 20, 2022

(86) PCT No.: PCT/EP2022/051284
§ 371 (c)(1),
(2) Date: Jul. 17, 2023

(87) PCT Pub. No.: WO2022/157273
PCT Pub. Date: Jul. 28, 2022

(65) Prior Publication Data
US 2024/0011110 A1 Jan. 11, 2024

(30) Foreign Application Priority Data
Jan. 22, 2021 (EP) ..................................... 21153020

(51) Int. Cl.
| | |
|---|---|
| *C14C 1/08* | (2006.01) |
| *C08F 251/00* | (2006.01) |
| *C08F 289/00* | (2006.01) |
| *C08L 3/02* | (2006.01) |
| *C08L 51/02* | (2006.01) |
| *C08L 51/08* | (2006.01) |

(52) U.S. Cl.
CPC .............. *C14C 1/08* (2013.01); *C08F 251/00* (2013.01); *C08F 289/00* (2013.01); *C08L 51/02* (2013.01); *C08L 51/08* (2013.01); *C08L 3/02* (2013.01)

(58) Field of Classification Search
USPC ......................................................... 8/94.15
See application file for complete search history.

(56) References Cited

U.S. PATENT DOCUMENTS

| | | | |
|---|---|---|---|
| 4,314,800 A | 2/1982 | Monsheimer et al. | |
| 2016/0244854 A1 | 8/2016 | Lourenco | |

FOREIGN PATENT DOCUMENTS

| | | |
|---|---|---|
| CN | 102559951 B | 4/2014 |
| CN | 109295265 A | 2/2019 |
| DE | 4416877 | 11/1995 |
| EP | 0059909 | 2/1982 |
| EP | 3425069 | 1/2019 |
| EP | 3425068 | 8/2021 |
| KR | 100788492 | 12/2007 |
| WO | 2012163823 | 12/2012 |
| WO | 2013107233 | 7/2013 |
| WO | 2017102291 A1 | 6/2017 |

*Primary Examiner* — Arti Singh-Pandey
(74) *Attorney, Agent, or Firm* — Volpe Koenig

(57) ABSTRACT

A deliming composition and a deliming method using graft polymers from polysaccharides and/or polypeptides or the corresponding derivatives, obtainable by radical polymerization of a monomer, selected at least from, or a monomer mixture of, acrylic acid or methacrylic acid or the mixtures thereof.

14 Claims, No Drawings

DELIMING COMPOSITION AND METHOD FOR DELIMING HIDES

CROSS-REFERENCE TO RELATED APPLICATIONS

This application is a 371 National Phase of International Application No. PCT/EP2022/051284, filed Jan. 20, 2022, which claims priority to European Patent Application No. 21153020.9, filed Jan. 22, 2021, both of which are incorporated herein by reference as if fully set forth.

TECHNICAL FIELD

The present invention relates to a deliming composition, to a process for deliming hides and to the use of a graft polymer as a deliming agent for deliming hides. The present invention relates more particularly to the deliming of hides by means of specific graft polymers.

BACKGROUND

The liming of hides in order to unhair them and open them up, such as to remove unwanted proteins, as part of leathermaking takes place in an alkaline medium, usually by means of inorganic or else organic sulfides at a pH of 12 or higher. The alkaline agent employed is normally lime, in general on its own, but occasionally also as a mixture with sodium hydroxide solution or soda. In preparation for further processing, the material ought subsequently to be freed of the liming chemicals again, particularly of the lime—that is, it ought to be "delimed". This step is accomplished typically by addition of acids or acidic salts which form very highly soluble complexes with the calcium ions so that they can be removed with the wastewater. Moreover, the pH of the hide is to be brought to a desired, substantially neutral value, since the optimum of the enzymes used in the subsequent treatment step in order to complete the opening-up of the hide is situated within this pH range. Examples of such acids include phthalic acid, sulfophthalic acid, formic acid, acetic acid, boric acid, aliphatic dicarboxylic acid and mixtures thereof, hydrochloric acid, sulfuric acid and ammonium salts thereof, and carbon dioxide.

While the pH ought to be reduced by a deliming agent even down into the cross section of the hides, the pH during the operation ought nevertheless not to fall down to, let alone below, the isoelectric point of protein, in other words, for instance, not below a pH value of around 5. If this does occur, the proteinaceous substances which have gone into solution during the prior liming are precipitated, possibly together with other dissolved particles, and are deposited on the surface of the hide material in a form which is difficult to remove. These residues render the surface of the hide unattractive and interfere with subsequent processing steps, particularly with dyeing. The hand of the end product ultimately produced, the leather, is adversely affected as well.

For this reason, the majority of acids can be added only in very small doses, gradually, so that the pH does not fall below around 5 even locally and for a short duration; owing to the fluctuating amount of lime present in the system during the leathermaking operation, this is impracticable or of only limited practicability.

The most frequently utilized to date for this reason for the deliming are ammonium salts which have a buffer range around about pH 9 and so make it unlikely for the pH to drop to a critical level. In addition, ammonium salts, in view of their use as fertilizer, are readily available worldwide and of economic interest. Their use, however, has disadvantages. First, ammonia gas is released during the deliming procedure, and as well as the odor nuisance may also lead to respiratory tract irritation in the operatives of such plants. Secondly, the wastewater contains a large quantity of ammonia nitrogen which is a problem from an environmental standpoint. For this reason there are often statutory regulations limiting the amount in the tannery drainage water to be discharged.

In order to avoid the problems described above, therefore, a myriad of alternative deliming agents have been developed.

The use of butyrolactone as a deliming agent is known from DE 804 827. This lactone hydrolyzes under the customary deliming conditions and so ensures a mild pH profile during the operation. However, the hydrolysis is very slow and the operating times are therefore of limited practicability.

EP 0 059 909 A1 uses cyclic carbonates, having five or six ring members, of a polyhydric aliphatic alcohol, examples being ethylene carbonate or 1,2-propylene carbonate, as deliming agents, with pH values of at least 7.5 being maintained when these agents are used. The effect here is again based on a basic hydrolysis of the ester. A disadvantage of these compounds, as in the case of the butyrolactone, is again a slow hydrolysis, and so the times required are in some cases too long for practical purposes.

A further deliming agent is disclosed in WO 2013/107233 A1. This agent consists of polysuccinimide or hydroxypolysuccinimide. The buffer effect derives from the ring opening of the polysuccinimide in the basic environment and ensures a stable pH regime during deliming. Because of the polymeric nature of the compounds, however, they are relatively slow to penetrate the hide, and for this reason have not become established.

EP 3 425 068 A1 discloses deliming agent in the form of amino acid and/or protein hydrolysate containing amino acid. The advantage in this case is that there is a pH buffering during the operation by virtue of the ampholytic nature of the amino acids. The amino acids additionally form soluble calcium salts. This is also true, however, only to a limited extent for the protein hydrolysate, in the case of which the majority of active nitrogen and carboxyl groups are blocked by peptide bonds with one another. While the degree of hydrolysis is not more closely specified, the patent nevertheless consistently mentions that a high degree of hydrolysis associated with a high amino acid content is preferred, since the amino acid is described as the actual deliming agent. As a result of the high degree of hydrolysis, however, the hydrolysis of possible protein sources is relatively complicated.

EP 3 425 069 A1 proposes a deliming agent in the form of a protein hydrolysate which is obtainable through acidic hydrolysis of hairs, shavings or other residual materials obtained during leathermaking. Here again, the amino acids are described as the active deliming agent. The need for a relatively complicated hydrolysis with a high degree of hydrolysis is apparent from the elevated-pressure hydrolysis shown in the examples, which necessitates the use of an autoclave for the hydrolysis.

SUMMARY

It is therefore the object of the present invention to provide a process for deliming hides that is able at least partly to overcome at least one disadvantage of the prior art.

It is the object of the present invention more particularly to provide a simple process for deliming hides that reduces or avoids the use of ammonium salts and where the deliming agent used is based wholly or partly on the use of renewable, natural polymers.

The object is achieved in accordance with the invention by a deliming composition having one or more of the features disclosed herein. The object is further achieved in accordance with the invention by a process for deliming raw hide, a process for producing leather, and a use, each including one or more of the features disclosed herein. Preferred configurations of the invention are disclosed in the claims, in the description and in the examples, where further features shown or described in the claims or in the description or the examples, individually or in any combination, may constitute a subject of the invention unless the opposite is clearly the case from the context.

The present invention relates to a deliming composition for deliming hides, wherein the deliming composition at least comprises:

a hide for deliming; and a deliming agent, the deliming agent comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or suchlike chemically modified degraded products or chemically modified mono-, oligo- or polysaccharides and wherein the derivatives of the polypeptides are hydrolytically or enzymatically degraded and optionally chemically modified polypeptides, the graft polymer being obtainable by radical polymerization of A) a monomer selected from or a monomer mixture of
(a) acrylic acid or methacrylic acid or a mixture thereof or the alkali metal, alkaline earth metal or ammonium salts thereof, and optionally at least one of (b) and (c), where
(b) comprise monoethylenically unsaturated monomers other than the monomers (a) and copolymerizable with the monomer (a), and where
(c) are monomers having at least two ethylenically unsaturated, nonconjugated double bonds in the molecule,
in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds.

Surprisingly it has been found that the deliming composition described here is able, in particular by virtue of the presence of the specific graft polymer as deliming agent, to achieve the above described object in relation to deliming of the hide to be delimed.

The deliming composition comprises first of all the hide for deliming. In this regard it may be explained that, in a conventional way, deliming is a working step which within leathermaking follows on from liming or painting, for example. Hide of this kind for deliming is also referred to as pelt. A feature of pelt is that in its case the hairs and/or the fat fraction has been reduced or, specifically following liming, that the hairs and/or the fat adhering to the hide have been removed. The limed hide therefore comprises, for example, only the pure raw hide, in particular without hairs and in particular without fat remnants.

The limed hide, for example, still contains substances which have been used for the liming. Stated here illustratively are calcium hydroxide and sodium sulfide, hydrated lime, sulfide of sodium, and various enzymes. Furthermore, the hide for deliming has a pH in the basic range as a result of the upstream operations, more particularly a pH in a range of greater than 9, such as of greater than or equal to 10, usually of greater than or equal to 11.

These substances, however, ought to be removed from the hide or pelt in order to prepare the hide for tanning, a further, conventional operating step in leathermaking. This step is more particularly the deliming, which likewise serves for preparation of the hide for tanning. During deliming, the substances used for liming, for example, are removed from the hide and additionally the pH is to be lowered, ideally to a substantially neutral range. This can be realized by means of a deliming agent. After the deliming, accordingly, the hide has a pH which is situated approximately in a range from greater than or equal to 7 to less than or equal to 9.

The deliming agent therefore serves in particular to lower the pH from the basic range to a substantially neutral range, and the deliming enables the liming substances, for example, to be removed.

In accordance with the invention the deliming agent comprises substantially a graft polymer of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or suchlike chemically modified degraded products or chemically modified mono-, oligo- or polysaccharides and wherein the derivatives of the polypeptides are hydrolytically or enzymatically degraded and optionally chemically modified polypeptides, the graft polymer being obtainable by radical polymerization of A) a monomer selected from or a monomer mixture of
(a) acrylic acid or methacrylic acid or a mixture thereof or the alkali metal, alkaline earth metal or ammonium salts thereof, and optionally at least one of (b) and (c), where
(b) comprise monoethylenically unsaturated monomers other than the monomers (a) and copolymerizable with the monomer (a), and where
(c) comprise monomers having at least two ethylenically unsaturated, nonconjugated double bonds in the molecule,
in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds.

Surprisingly, therefore, it has been found that the object can be achieved using graft polymers of polysaccharides and/or polypeptides or their respective derivatives, obtainable through radical polymerization of a monomer selected at least from or of a monomer mixture of acrylic acid or methacrylic acid or mixtures thereof. Graft polymers of this kind based on natural polymers are known and their preparation is described in documents including WO2012/163823 and DE4416877. In contrast to those documents, where the polymers in question are used for tanning, in other words for an operating step subsequent to deliming, the advantages of the above-described polymers as deliming agents, surprisingly, have been found.

These compounds are able to meet the stated object without the need for a complicated hydrolysis to a high degree of hydrolysis of the natural polymer component, such as the leather shavings, for example, and in spite of their polymeric nature.

It is advantageous here that the polymer components can comprise natural polymer components. Natural polymer components are understood in this context to be all kinds of polysaccharide and polypeptide sources. Examples thereof include starch, shavings, leather pieces, bone glue, hairs and feathers, which may serve as polysaccharides or polypeptides.

In order to form the deliming composition, the graft polymers utilized for deliming may also be admixed with deliming auxiliaries, buffer salts, organic acid or proteolytic enzymes.

Deliming auxiliaries may be magnesium salts, sugars and/or molasses. The buffer salt described may be selected from sodium pyrosulfate, sodium bisulfite, sodium formate, sodium acetate, and the acid described may be selected from phthalic acid, sulfophthalic acid, formic acid, acetic acid, lactic acid, citric acid, succinic acid, hexanedioic acid, boric acid, aliphatic dicarboxylic acid and mixtures thereof, hydrochloric acid, sulfuric acid and its ammonium salts, and carbon dioxide. The proteolytic enzyme described may be selected from softening proteolytic enzymes.

Particularly through the use of the deliming agent, the deliming composition described makes it possible that as a result a method for deliming hides, known per se to the skilled person, can be carried out, with only the deliming agent needing to be modified. In other words, conventional operations can be used, with the deliming agent used being the graft polymer described or with the deliming agent comprising the graft polymer described.

The advantage of the deliming composition described is therefore in particular that the use of ammonium salts in a deliming operation can be avoided or reduced through the use of graft polymers based on natural polymers. The use of renewable raw materials and the reduction of the ammonium salts in the wastewater lead to considerable environmental and economic advantages. When residual materials obtained during leathermaking, such as hairs and shavings, for example, are used as starting material for the graft polymers, there are also logistical advantages for the tanneries, in addition to the reduction in the amount of waste.

In accordance with the invention, furthermore, it is possible to ensure that the pH is reduced even into the cross section of the hides, with the pH, however, not falling to, let alone below, the isoelectric point of protein. This prevents the proteinaceous substances which have gone into solution during the prior liming, optionally together with other dissolved particles, from precipitating and depositing on the surface of the hide material in a form which is difficult to remove. Residues which render the surface of the hide unattractive and interfere in subsequent processing operations, especially in dyeing, can be significantly reduced or even entirely prevented in this way. Nor is there any adverse effect on the hand of the end product ultimately produced, namely the leather.

Through the omission of ammonium salts, as is possible in accordance with the invention, meaning that the deliming composition is free from such salts, it is also possible to prevent the release of ammonia gas, which as well as the odor nuisance may also cause respiratory tract irritation to the operatives of such plants. Furthermore, the wastewater preferably contains no ammonia nitrogen, or only an extremely small amount in addition to that originating from the hide, and this may further improve environmental aspects. In other words, any such ammonia nitrogen may occur, but only in very small amounts in particular by comparison with deliming processes from the prior art.

Furthermore, the graft polymers may preferably be dispersible in water or water-soluble, and this may have a particularly positive impression on the operating regime in a deliming.

In summary, therefore, there are particular advantages in terms of environmental and economic considerations that were not possible in such a way in the prior art.

The preferably water-soluble graft polymers are obtainable through homo- or copolymerization of the monomers A in the presence of the natural substances B1) and/or B2). Suitable monomers A encompass the group (a) of (meth) acrylic acid and the alkali metal, alkaline earth metal or ammonium salts thereof. Mixtures thereof may also be used. These salts are obtainable, for example, from (meth)acrylic acid if the acid is neutralized in aqueous solution with sodium hydroxide solution, magnesium hydroxide solution, ammonia, amines or alkaloamines. The monomers A of group (a) may be subjected to the graft copolymerization together with other monoethylenically unsaturated monomers (b) which are copolymerizable with the monomers (a). The amount of the monomers (a) in the monomer mixture is in that case 20 to 100, preferably 40 to 100, more particularly 98 to 100, wt %, based on all the monomers A, while the monomers (b) may be contained therein in an amount of up to 80, preferably up to 60, more particularly up to 2, wt %.

Examples of the monomers A of group (b) which are used in the graft polymerization are crotonic acid, maleic acid, maleic anhydride, fumaric acid, citraconic acid, citraconic anhydride, $C_1$-$C_8$ alkyl and hydroxyalkyl esters of acrylic acid, methacrylic acid or crotonic acid and mono- or di-$C_1$-$C_8$ alkyl or hydroxyalkyl esters of maleic acid, fumaric acid or citraconic acid, e.g., methyl acrylate, ethyl acrylate, n-butyl acrylate, methyl methacrylate, monomethyl maleate, dimethyl maleate, monoethyl maleate, diethyl maleate, β-hydroxyethyl acrylate, β- and γ-hydroxypropyl acrylate, δ-hydroxybutyl acrylate, β-hydroxyethyl methacrylate and β- and γ-hydroxypropyl methacrylate. Also suitable as monomers A of group (b) are amides and N-substituted alkylamides of the compounds stated under (a), e.g., acrylamide, methacrylamide, N-alkyl(meth)acrylamides in which the alkyl group has 1 to 18 carbon atoms, such as N-methylacrylamide, N,N-dimethylacrylamide, N-tert-butylacrylamide, N-octadecylacrylamide, dimethylamino-propylmethacrylamide and acrylamidoglycolic acid. Other suitable monomers (b) are alkylaminoalkyl (meth)acrylates, e.g., β-(dimethylamino)ethyl methacrylate, β-(dimethyl-amino)ethyl acrylate, β-(diethylamino)ethyl acrylate, δ-(di-ethylamino)propyl acrylate and δ-(diethylamino)propyl methacrylate.

Further suitable monomers of group (b) are monomers containing sulfo groups, e.g., vinylsulfonic acid, allylsulfonic acid, methallylsulfonic acid, styrene sulfonic acids, 3-sulfopropyl acrylate, 3-sulfopropyl methacrylate and acrylamidopropanesulfonic acid, and also monomers having phosphonic acid groups, e.g., vinylphosphonic acid, allylphosphonic acid and acrylamidomethylpropanesulfonic acid.

This group (b) of the monomers A also includes N-vinylpyrrolidone, N-vinylcaprolactam, N-vinylformamide, N-vinyl-N-methylformamide, 1-vinylimidazole, 1-vinyl-2-methylimidazole, vinyl acetate and vinyl propionate, acrylonitrile and methacrylonitrile, acrolein and methacrolein, crotonaldehyde and the acetals thereof.

Further suitable monomers A of group (b) are esters of alkoxylated $C_1$-$C_8$ alcohols which have been reacted with 2 to 50 mol of ethylene oxide, propylene oxide, butylene oxide or a mixture thereof with the monoethylenically unsaturated carboxylic acids of group (a), examples being the esters of acrylic acid or methacrylic acid with a $C_{13/15}$ alcohol, having been reacted with different amounts of ethylene oxide, e.g., 3, 5, 7, 10 or 30 mol of ethylene oxide.

Also suitable as monomers A of group (b) are vinlyaromatics, such as styrene and α-methylstyrene, and also $C_1$-$C_{12}$ olefins, e.g., ethylene, propylene, 1-butene, 2-butene or butadiene.

Further suitable monomers A of group (b) are N-monosubstituted and N,N-disubstituted amides of monoethylenically unsaturated $C_3$-$C_8$ carboxylic acids, where the amide nitrogen carries substituents in the form of polyoxyalkylated $C_2$-$C_{28}$ alkanols, more particularly $C_2$-$C_{18}$ alkanols, which have been reacted with 2 to 100, more particularly 3 to 20, mol of ethylene oxide, propylene oxide and/or butylene oxide. Examples of such compounds are $H_2C$=CH—CO—NH—$CH_2CH_2$—O$(C_2H_4O)_n$—H, $H_2C$=CH—CO—N[$CH_2CH_2O$—$(C_2H_4O)_n$—H]$_2$, $H_2C$=C($CH_3$)—CO—NH—$(CH_2)_4$—O—$(C_2H_4O)_n$—H, $H_2C$=C($CH_3$)—CO—NH—$C_2H_4O$—$(C_3H_6)_n$—H and $H_2C$=CH—CO—NH—$(CH_2)_{18}$—O—$(C_2H_4O)_n$—H, where n in the aforesaid compounds is 3 to 20.

The basic monomers are used preferably in the form of the salts with mineral acids, e.g., hydrochloric acid, sulfuric acid or nitric acid, or in quaternized form. Suitable quaternizing agents are, for example, dimethyl sulfate, diethyl sulfate, methyl chloride, ethyl chloride and benzyl chloride. The carboxylic acids are used preferably in the form of the free acids and as alkali metal, alkaline earth metal or ammonium salts or as mixtures thereof.

Components (b) of the monomer mixture A which are used preferably for preparing the graft polymers are crotonic acid, maleic acid, maleic anhydride, fumaric acid, citraconic acid, citraconic anhydride, $C_1$-$C_8$ alkyl, more particularly $C_1$-$C_4$ alkyl, or hydroxyalkyl esters of acrylic acid or methacrylic acid or crotonic acid, mono- or di-$C_1$-$C_8$ alkyl, more particularly $C_1$-$C_4$ alkyl or hydroxyalkyl esters of maleic acid, fumaric acid or citraconic acid, acrylamide, methacrylamide, methacrolein, acrylamidomethylpropanesulfonic acid, N-vinylimidazole or a mixture thereof.

The graft polymers may be modified further by performing the graft polymerization in the presence of monomers A of group (c). In this case the monomer mixtures comprise in particular up to 5 wt % of a monomer having at least two ethylenically unsaturated, nonconjugated double bonds in the molecule. These compounds are used typically as crosslinkers in copolymerizations. They may be added to the monomers of group (a), which are used for the copolymerization or to the monomer mixtures of (a) and (b). Where they are used, the preferred amount used of the monomers (c) is 0.05 to 2 wt %, based on the total monomer amount.

The simultaneous use of the monomers A of group (c) in the copolymerization leads to an increase in the K values of the copolymers.

Correspondingly it may be advantageous for the monomer mixture of the monomer (A) to comprise:

(a) acrylic acid or methacrylic acid or a mixture thereof or the alkali metal, alkaline earth metal or ammonium salts thereof, and at least one of (b) and (c), where (b) comprise monoethylenically unsaturated monomers other than the monomers (a) and copolymerizable with the monomer (a), and where (c) are monomers having at least two ethylenically unsaturated, nonconjugated double bonds in the molecule.

Suitable compounds (c) are, for example, methylenebisacrylamide, esters of acrylic acid and methacrylic acid with polyhydric alcohols, e.g., glycol diacrylate, glyceryl triacrylate, ethylene glycol dimethacrylate, glyceryl trimethacrylate and polyols, such as pentaerythritol and glucose, which are at least diesterified with acrylic acid or methacrylic acid. Further suitable crosslinkers are divinylbenzene, divinyldioxane, pentaerythritol triallyl ether and pentaallylsucrose. Preferred for use from this group are water-soluble monomers, more particularly ethylene glycol diacrylate or glycol diacrylates of polyethylene glycols having a molecular weight of up to 3000 daltons or a mixture thereof. In one preferred embodiment, the graft polymers are prepared using acrylic acid or the alkali metal, alkaline earth metal or ammonium salts thereof alone as monomer A, or using a mixture of at least 80, more particularly at least 98, wt % of acrylic acid or the alkali metal, alkaline earth metal or ammonium salts thereof and the monomers (b) as monomer mixture A. The monomers A are polymerized preferably in the presence of natural substances based on the compounds B1) or B2).

It may, however, also be advantageous if the monomer A is free from the monomers (b) and (c) or for the monomer A to consist only of the monomers (a).

B1

Derivatives of polysaccharides are oxidatively, hydrolytically or enzymatically degraded polysaccharides, oxidized hydrolytically degraded or oxidized enzymatically degraded polysaccharides, or such chemically modified degradation products or chemically modified mono-, oligo- or polysaccharides.

From an economic standpoint, polysaccharides of component B1) that are used in the graft polymerization are preferably starch, thermally and/or mechanically treated starch, oxidatively, hydrolytically or enzymatically degraded starches and chemically modified starches; more particularly, any starch is suitable. Preference, however, is given to using starches which are obtained from corn, wheat, rice and tapioca, and also, in particular, potato starches. The starches are virtually water-insoluble and may be converted to a water-soluble form in a known way through thermal and/or mechanical treatment or through enzymatic or acid-catalyzed degradation. Further suitable components B1) are oxidatively degraded starches. Examples of starch degradation products obtainable by oxidative, hydrolytic or enzymatic degradation of starch are the following compounds: dextrins, such as white and yellow dextrins, maltodextrins, glucose syrups, maltose syrups, hydrolysis products having a high D-glucose content, starch saccharification products, and also maltose and D-glucose and their isomerization product fructose.

Further suitable components B1) are oxidized starches, e.g., dialdehyde starch, and oxidized starch degradation products, such as gluconic acid, glucaric acid and glucuronic acid. Such compounds are obtained for example by oxidizing starch with periodate, chromic acid, hydrogen peroxide, nitrogen dioxide, nitrogen tetroxide, nitric acid or hypochlorite.

Further suitable components B1) are chemically modified polysaccharides, especially chemically modified starches, e.g., starches and starch degradation products which have undergone reaction with acids to form esters and with alcohols to form ethers. The esterification of these substances is possible both with inorganic and with organic acids and/or their anhydrides or chlorides; in the case of the direct esterification, the water that is liberated leads to the acid-catalyzed splitting of the glycosidic bonds. Of particular industrial interest are phosphated and acetylated starches and starch degradation products. The most common method for etherifying starch is the treatment of the starch or starch degradation products with organic halogen compounds, epoxides or sulfates in aqueous-alkaline solution. Starch ethers are, for example, the alkyl ethers, hydroxyalkyl ethers, carboxyalkyl ethers and allyl ethers of starch. Chemically modified starches of component B1) refer in particular to cationically modified starches, examples being starches reacted with 2,3-epoxypropyltrimethylammonium chloride, as are described in U.S. Pat. No. 3,649,616.

The chemically modified polysaccharides include, for example, carboxymethylcellulose, hydroxyethylcellulose, hydroxypropylcellulose, carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Further suitable components B1) are chemically modified starch degradation products, examples being hydrogenated products of starch hydrolysis, such as sorbitol and mannitol, maltitol and hydrogenated glucose syrups or oxidized hydrolytically or enzymatically degraded starches.

Also suitable are the products of acid-catalyzed or enzymatic transglucosidation or glycosidation, e.g., methylglucoside.

Particularly preferred components B1) are hydrolytically degraded starches, especially of wheat, having for instance a high content of monosaccharides, and pure monosaccharides.

In one preferred embodiment, the polysaccharide B1) has a mean molecular weight of 500 to 10000 daltons, more particularly of 3000 to 10000 daltons, preferably 3000 to 8000 daltons. More preferably the polysaccharide B1) is an oxidatively, hydrolytically or enzymatically degraded polysaccharide having a mean molecular weight of 500 to 10000 daltons, more particularly of 3000 to 10000 daltons, preferably 3000 to 8000 daltons, especially hydrolytically degraded starch.

The particularly preferred polysaccharide B1) is the hydrolytically degraded starch from food plants such as potato or corn, in particular having a broad molecular weight distribution. This may be achieved by mixing different hydrolytically degraded starches.

B2

Derivatives of polypeptides are hydrolytically degraded or enzymatically degraded and optionally chemically modified polypeptides.

In terms of the polypeptides B2), preference is given to all proteins of which a fraction of at least 20 wt % dissolves in the polymerization medium under the polymerization conditions. Examples of suitable proteins are specified in Ullmanns Enzyklopadie der technischen Chemie, 4th edition, Weinheim, 1980, volume 19, pp. 491 to 557. The polypeptides are renewable raw materials. They originate, for example, from skins, supporting and connective tissue, bone and cartilage, e.g., collagen, elastin, gelatin, ossein and skin adhesive. Polypeptides from milk are milk polypeptides, casein and lactalbumin. Wool, bristles, feathers and hairs yield keratin. Likewise suitable are polypeptides from fish and eggs and from blood as abattoir waste, for example blood polypeptides, albumin, globulin, globin, fibrinogen and hemoglobin. Further suitable polypeptides come from plants, such as, for example, corn, wheat, barley and oats, e.g., glutelin, prolamin, zein and gluten. Polypeptides, furthermore, may be obtained from seed material, for example from soybeans, cotton seeds, peanuts, sunflowers, rapeseed, coconuts, linseed, sesame, safflower, peas, beans and lentils. The polypeptide constituents of clover, alfalfa, grass, potatoes, cassava and yam may be used, furthermore. Further polypeptide sources are bacteria, fungi, algae and yeasts, examples being *Pseudomonas, Lactobacillus, Penicillium*, blue algae, green algae, *Chlorella, Spirulina* and spent yeast.

Preferred polypeptides as component B2) for preparing the graft copolymers are collagen from skin and pellage (natural or modified by tanning), casein, gelatin, bone glue, polypeptides from soy, cereals, especially wheat and corn, and peas. The polypeptides may be obtained from the natural raw materials by means, for example, of dissolving, grinding, sieving and classifying. To bring them into a preferred soluble form it is in many cases necessary to perform a digestion by physical, chemical or enzymatic treatment, e.g., hydrolysis with acids or alkalis, fermentation with yeasts, bacteria or enzymes, extraction methods for removing secondary constituents, coagulation from extracts by heating, addition of electrolyte, pH adjustment, or addition of precipitants. Pure products may be prepared, for example, by fractional dissolution and precipitation or by dialysis.

Preferred polypeptides B2) have a mean molecular weight of more than 1000 daltons, more particularly more than 3000 daltons, and are preferably selected from the group consisting of an animal polypeptide, plant polypeptide, and hydrolysates thereof.

Molecular weights of this kind show that in accordance with the invention hydrolysates can be used without the need to have to establish a high degree of hydrolysis.

B2) with particular preference comprises recycled leather wastes through hydrolysis, protein extract from defatted oil seeds such as soy, milk protein, and plant proteins from wheat or rice.

With further preference it is possible for the polypeptide to comprise worked-up shavings—for instance, shavings which have been worked up enzymatically or using bases—of cattle hide having undergone chrome or chromium-free tanning. The reuse of chromium-containing shavings, as one of the residual materials obtained during leathermaking, is especially of interest from an environmental viewpoint. These shavings are obtained in leathermaking in the context of adjusting the thickness, shaving as it is known, as small planed shavings which consist primarily of collagen-containing material. If the leather was tanned beforehand by means of a chrome tanning agent, the chrome-tanned leather in the still-wet condition, also referred to as wet blue, contains not only collagen but also typically around 2 to 6 wt % of chromium in the (III) oxidation state. As chrome tanning is the most widespread tanning method, accordingly, large waste quantities of chromium-containing leather shavings are produced (around 17000 t per year in Germany alone). Separation into the protein and chromium constituents, and especially the reuse of the chromium fraction, which is possible only at high cost and complexity, often renders the entire recycling of the large waste quantities uneconomic, meaning that leather shavings in their entirety are disposed of and landfilled as special waste, are pressed to form leather fiber material, or are burned under control conditions, albeit at the expense of the environment. Common methods for separating protein and chromium include the decomposition of the leather shavings using acids or bases and/or by microbial and/or enzymatic degradation under heat; these steps are usually combined with one another in a costly and complicated multistage operation. The acidic hydrolysis of the shavings, as chosen in EP 3425069, necessitates a costly and complicated pretreatment of chromium-containing material in order to remove the entire chromium from the starting material before the hydrolysis. The pretreatment of the chromium-containing shavings consistently lasts between 2-4 days. This renders the operation described for chromium-containing material costly and complicated and very time-consuming.

When chromium-containing shavings are being used, owing to the possibility of hydrolysis with base and/or microbial and/or enzymatic degradation under heat, it is possible to forego a costly and complicated pretreatment of the chromium-containing leather shavings for the purpose of separating chromium and protein fractions. Since chromium becomes insoluble at a pH of >4.5, the solid, chromium-containing residue that remains can be separated from the liquid, protein-containing filtrate by simple filtration. The protein-containing filtrate can then be taken as a starting material in the subsequent graft polymers as are described for example in WO2012/163823 or DE4416877.

Graft Polymer Preparation Process

To prepare the graft polymers, the monomers A are subjected to a radical polymerization advantageously in the presence of compounds of the saccharide component B1) and/or of the protein component B2). In certain cases it may be advantageous for the effect of the resultant graft polymer to use two or more of the compounds stated under B1) or two or more of the compounds stated under B2. Under B1), mention may be made, for example, of mixtures of acid-catalytically or enzymatically degraded starch and gluconic acid, mixtures of a monosaccharide and an oligosaccharide, mixtures of an enzymatically degraded starch and a monosaccharide, or mixtures of glucose and sucrose or mannose. For B2), mention may be made of mixtures of leather waste hydrolysate and plant proteins from wheat or rice, the mixtures of bone glue and milk protein, or the mixture of soy protein and feather hydrolysate. The polymerization may be conducted in the presence or absence of inert solvents or inert diluents. Since the polymerization in the absence of inert solvents or diluents in some cases leads to nonuniform graft polymers, preference is given to graft polymerization in an inert solvent or diluent. Suitability is possessed for example by those inert diluents in which the compounds stated under B1) or B2) can be suspended and which dissolve the monomers A; in these cases, after the polymerization, the graft polymers are present in suspended form and may easily be isolated in solid form by filtration.

Suitable inert diluents are, for example, toluene, o-, m- and p-xylene and isomer mixtures thereof, ethylbenzene, aliphatic hydrocarbons or benzine fractions containing no polymerizable monomers. Chlorinated hydrocarbons, such as chloroform, carbon tetrachloride, hexachloroethane, dichloroethane and tetrachloroethane, are likewise suitable.

In the above described process wherein component B1) or B2) is suspended in an inert diluent, preference is given to using anhydrous compounds of component B1) or B2), with preference being given to the use of anhydrides of dicarboxylic acids from the group (b) of the monomers A. A preferred process for preparing the graft polymers is that of solution polymerization, in which case the polysaccharide component B1) and/or B2), the monomers A and the resulting graft copolymer are present at least in disperse form and in many cases in dissolved form. Suitability for the solution polymerization is possessed for example by inert solvents such as water, methanol, ethanol, isopropanol, n-propanol, n-butanol, sec-butanol, tetrahydrofuran, dioxane and mixtures thereof.

The polymerization may be carried out continuously or batchwise. As already mentioned, the components A and B1) or B2) may also be polymerized in the absence of inert diluents or solvents. Particularly suitable for this purpose is continuous polymerization at 160 to 250° C. If necessary, it is possible here as well to proceed in the absence of polymerization initiators. Preferably, however, catalysts are used, here as well, that form free radicals under the polymerization conditions, examples being inorganic and organic peroxides, persulfates, azo compounds and redox catalysts. The preferably water-soluble graft polymers described are prepared generally in the presence of radical initiators. Preferred radical initiators are all compounds which exhibit a half-life of less than 3 hours at the particular polymerization temperature selected. Where the polymerization is first initiated at a relatively low temperature and concluded at a higher temperature, it is advantageous to carry out the reaction with at least two initiators which decompose at different temperatures—that is, first to use an initiator which decomposes at a relatively low temperature, for initiating the polymerization, and then to conclude the main polymerization with an initiator which decomposes at a higher temperature. Use may be made of water-soluble and water-insoluble initiators or mixtures of water-soluble and water-insoluble initiators. The water-insoluble initiators are then soluble in the organic phase.

For the 40° C. to 60° C. temperature it is possible advantageously to use the following initiators: acetyl cyclohexansulfonyl peroxide, diacetyl peroxydicarbonate, dicyclohexyl peroxydicarbonate, di-2-ethylhexyl peroxydicarbonate, tert-butyl perneodecanoate, 2,2'-phenylpropionamidine dihydrochloride, 2,2'-azobis(2-methylpropionamidine) dihydrochloride. For the greater than 60° C. to 80° C. temperature, the following initiators may advantageously be used: tert-butyl perpivalate, dioctanoyl peroxide, dilauroyl peroxide, 2,2'-azobis(2,4-, 5-dimethylvaleronitrile).

For the greater than 80° C. to 100° C. temperature, the following initiators may advantageously be used: dibenzoyl peroxide, tert-butyl per-2-ethylhexanoate, tert-butyl permaleate, 2,2'-azobisisobutyronitrile, dimethyl-2,2'-azobisisobutyrate, sodium persulfate, potassium persulfate, ammonium persulfate.

For the greater than 100° C. to 120° C. temperature, the following initiators may advantageously be used: bis(tert-butylperoxy)cyclohexane, tert-butyl peroxyisopropyl carbonate, tert-butyl peracetate, hydrogen peroxide.

For the greater than 120° C. to 140° C. temperature, the following initiators may advantageously be used: 2,2-bis (tert-butylperoxy)butane, dicumyl peroxide, di-tert-amyl peroxide, di-tert 5-butylperoxide.

For the greater than 140° C. temperature, the following initiators may advantageously be used: p-menthane hydroperoxide, pinane hydroperoxide, cumene hydroperoxide and tert-butyl hydroperoxide. Where, in addition to the stated initiators, use is also made of salts or complexes of heavy metals, e.g., salts of copper, cobalt, manganese, iron, vanadium, cerium, nickel and chromium, or organic compounds, such as benzoin, dimethylaniline or ascorbic acid, for example either solely as grafting agents or as auxiliaries for radial initiators. In the case of use with radical initiators, the half-lives of the stated radical initiators can be reduced. For example, tert-butyl hydroperoxide may be activated by addition of 5 ppm of copper(II)-acetylacetonate, allowing the polymerization to take place at just 100° C.: the reducing component of the redox catalysts may also be provided, for example, by compounds such as sodium sulfite, sodium bisulfite, sodium formaldehyde sulfoxylate and hydrazine.

Use is made preferably of 0.01 to 20 wt %, preferably 0.05 to 15 wt %, based on the monomers A used in the polymerization, of a polymerization initiator or of a mixture of two or more polymerizations initiators, radical initiators or heavy metal-based grafting agents. As redox components, 0.01 to 30 wt %, based on the monomers A used in the polymerization, of reducing compounds are added; heavy metals are used in an amount of 0.1 to 100 ppm, preferably of 0.5 to 10 ppm, based on the monomers A used in the polymerization. It is also advantageous to use a combination of peroxide, reducing agent and heavy metal as redox catalyst.

The monomers A may also be polymerized with exposure to ultraviolet radiation, in the presence or absence of UV initiators. For the polymerization with exposure to UV radiation, the customary photoinitiators or sensitizers are used. These are, for example, compounds such as benzoin and benzoin ethers, α-methylbenzoin and α-phenylbenzoin. Triplet sensitizers as well, such as benzyl diketals, may be used. Suitable UV radiation sources include not only high-energy UV lamps, such as carbon arc lamps, mercury vapor lamps or xenon lamps, for example, but also, for example, low-UV light sources, such as fluorescent tubes with a high blue component.

The preferred process for preparing graft polymers in accordance with the present invention, where component B1) or B2) is used as core, is the radically induced copolymerization wherein the components of the monomers of A) are added in an inert solvent at a temperature of 40° C. to 180° C. in the presence of a radical-forming initiator to B1) or B2), characterized in that at least 50 wt %, more particularly more than 70 wt %, of the radical-forming initiator is present with component B1) or B2) prior to the addition of the monomers A) and the remainder is added together with the monomers of A) or thereafter.

The rest of the initiator is preferably added to the reaction mixture together with the monomers of A).

In the graft polymerization, a chain transfer agent may be used in order to regulate the sidechain lengths as necessary. The chain transfer agent used may be any compound which contains active hydrogen. Examples of suitable agents are mercapto compounds, such as mercapto alcohols, mercapto acids or mercapto esters. Further suitable agents are allyl alcohols, aldehydes, formic acid, amines or salts thereof. It is possible when required to use 0.05-10 wt %, based on the amount of the monomers A.

The other conditions for the graft polymerization are in line with the customary process for such an operation. The polymerization system ought to be in an inert gas atmosphere with exclusion of atmospheric oxygen. The water-soluble phosphorus compound with the 1-4 oxidation state may be used in order to reduce the color of the resultant graft polymer, while the temperature and the uniformity of product may be monitored by appropriate mixing and limitation of the rate of addition of the monomer mixture A.

As already mentioned, it is also possible to subject polysaccharides B1) in aqueous suspension to the graft polymerization. Preferably, however, graft polymers are prepared from polysaccharides by first converting a water-insoluble polysaccharide in aqueous suspension into a water-soluble form, with addition of enzymes and/or acids, and subjecting the resulting aqueous solution of the degraded polysaccharide to the graft polymerization. In this case a water-insoluble polysaccharide, potato starch for example, is first suspended in water and degraded. This degradation may take place with exposure to enzymes, such as α- or β-amylase, or to debranching enzymes, such as pullulanase or by exposure to inorganic or organic acids, in a known way. Examples of suitable inorganic acids are phosphoric acid, sulfuric acid, hydrochloric acid and nitric acid. Examples of suitable organic acids are saturated or unsaturated carboxylic acids, e.g., formic acid, acetic acid, propionic acid, acrylic acid, methacrylic acid, maleic acid, itaconic acid, p-toluene sulfonic acid and benzene sulfonic acid.

The enzymatic degradation of the starch is carried out at 30° C. to 120° C.; the hydrolytic degradation of the starch takes place at 50° C. to 150° C. For the hydrolytic degradation, about 5 minutes to 10 hours are needed, with the degree of hydrolytic degradation of the starch being dependent on the selected temperature, the pH and the time.

In the graft polymerization, the temperatures are customarily between 40° C. and 180° C., preferably between 60° C. and 150° C. As soon as the temperature during the polymerization is above the boiling points of the inert diluent or solvent or of the monomers A, the polymerization is carried out under pressure. The concentration of components A and B1) or B2) in the polymerization in the presence of inert solvents or inert diluents is 10 to 80, preferably 20 to 70 wt %.

The graft polymers may be prepared in the customary polymerization apparatuses. For this purpose use is made, for example, of stirred tanks which are fitted with anchor, paddle or impeller stirrers or with multistage impulse countercurrent stirrers. Particularly in the case of graft polymerization in the absence of diluents, it may be advantageous to carry out the polymerization in a compounder. It may also be necessary to carry out the polymerization in a compounder if the process is conducted at high concentrations or if the natural substances have high molecular weights and initially swell strongly.

In one preferred configuration, the graft polymer may be obtainable by radical polymerization of acrylic acid, polypeptide hydrolysate and polysaccharide hydrolysate. For example, the monomer mixture used for preparing the graft polymer may consist of acrylic acid, polypeptide hydrolysate and polysaccharide hydrolysate, thus contain no monomers other than those stated above.

The aqueous graft polymer solutions or dispersions obtained by the process of the present invention may be employed directly as agents for deliming in the production of leather and hides. However, they may also comprise further additives and may also be dried with or without further additives, by spray drying, for example.

The graft polymers preparable by the processes stated above are colorless to brownish products. In the case of polymerization in aqueous medium, they take the form of dispersions or polymer solutions. Depending on the respective composition and/or concentration of the graft polymers, the products are low-viscosity to pasty aqueous solutions or dispersions. Because of the content of natural substances, the graft polymers described are more readily biodegradable than the polymers used to date on the basis of ethylenically unsaturated monomers, but can at least be eliminated from the wastewater of treatment plants with the sewage sludge.

The aqueous graft polymer solutions obtainable in this way are very suitable as deliming agents for the production of leather and hides.

The graft polymers of the invention may be employed accordingly for deliming hides in an aqueous liquor. Used with particular advantage for these applications are graft polymers which are composed of acrylic acid or salts thereof alone or of a monomer mixture A of acrylic acid or salts thereof (a) and monomers (b) with at least 80, more particularly at least 98, wt % of (a).

In principle it may be preferable for the graft polymer to be obtainable by radical polymerization of A) a monomer selected from or a monomer mixture of (a) 20 to 100 wt % of acrylic acid or methacrylic acid or a mixture thereof or the alkali metal, alkaline earth metal or ammonium salts thereof, based on the monomer A, (b) 0 to 80 wt % of other monoethylenically unsaturated monomers which are copolymerizable with the monomer (a), based on the monomer A, and (c) 0 to 5 wt % of monomers having at least two ethylenically unsaturated, nonconjugated double bonds in the molecule, based on the monomer A, in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds, preferably in a weight ratio of A:(B1+B2) of 60:40 to 1:99.

With reference to further advantages and technical features of the deliming composition, reference is made to the observations concerning the deliming process, the process for producing a leather, the use and the examples, and vice versa.

Further described is a deliming process for deliming a hide for deliming, more particularly wherein the deliming process comprises reducing the pH of a hide for deliming. The process is characterized in that the process comprises at least the following process steps:

a) providing a hide for deliming; and b) treating the hide for deliming with a deliming agent, the deliming agent comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or suchlike chemically modified degraded products or chemically modified mono-, oligo- or polysaccharides and wherein the derivatives of the polypeptides are hydrolytically or enzymatically degraded and option ally chemically modified polypeptides, obtainable by radical polymerization of A) a monomer selected from or a monomer mixture of (a) acrylic acid or methacrylic acid or a mixture thereof or the alkali metal, alkaline earth metal or ammonium salts thereof, and optionally at least one of (b) and (c), where (b) comprise other monoethylenically unsaturated monomers copolymerizable with the monomer (a), and where (c) are monomers having at least two ethylenically unsaturated, nonconjugated double bonds in the molecule, in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds.

A process of this kind is therefore a deliming process in which a hide having undergone liming beforehand in particular is to be freed from liming substances and in which in particular the pH of the hide is to be lowered to a substantially neutral range, more particularly in a range of 7-9. A hide for deliming is therefore more particularly such a hide which has a pH in the basic range, more particularly in a pH range of greater than 9, more particularly greater than or equal to 10, for instance greater than or equal to 11.

The process on which the invention is based corresponds in particular to a hide deliming process known per se to the skilled person, but where the graft polymers described are used as deliming agents.

The process may in the first step include what is called preliminary deliming, using buffer salts and/or acids. It is, however, also possible to forgo the preliminary deliming. In that case the process described comprises, for example, the following steps: a) the hide for deliming that is provided is washed with water and the water is drained off, after which water, sodium bisulfite and a deliming agent consisting of an organic acid are added; b) the deliming agent based on the graft polymers is added and optionally but in no way necessarily a small amount of ammonium salt is added, and during the course the pH is detected; c) as soon as the cross section of the hide no longer shows any staining with phenolphthalein, the operation is at an end.

The advantage of the process described is therefore that the use of ammonium salts in a deliming operation can be avoided or reduced by using graft polymers based on natural polymers. The use of renewable raw materials and the reduction in the ammonium salts in the wastewater result in considerable environmental and economic advantages. When using residual materials obtained during leathermaking, such as hairs and shavings, for example, as starting material for the graft polymers, there are logistical advantages for the tanneries as well as the reduction in the amount of waste.

In process step b), preferably, the deliming agent may be added in a fraction of ≥0.5 wt % to ≤12 wt %, preferably ≥1.5 wt % to ≤8 wt %, for instance ≥2 wt % to ≤6 wt %, preferably ≥2.5 wt % to ≤5 wt %, based on the amount of the limed pelt. It has emerged that, particularly in such a proportion of the deliming agent, this agent is able effectively to enable deliming, but without excessively altering the pH locally. In particular it is possible to prevent the local lowering of the pH into a highly acidic range, this being disadvantageous as described above.

With reference to further advantages and technical features of the deliming process, reference is made to the observations concerning the deliming composition, the process for producing leather, the use and the examples, and vice versa.

Further described is a process for producing leather, comprising the process steps of:

i) providing a raw hide;

ii) liming or painting the raw hide;

iii) deliming the raw hide; and iv) tanning the raw hide, where the process is characterized in that the deliming of the raw hide in process step iii) is carried out using a deliming agent which comprises a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or suchlike chemically modified degraded products or chemically modified mono-, oligo- or polysaccharides and wherein the derivatives of the polypeptides are hydrolytically or enzymatically degraded and optionally chemically modified polypeptides, the graft polymer being obtainable by radical polymerization of A) a monomer selected from or a monomer mixture of
(a) acrylic acid or methacrylic acid or a mixture thereof or the alkali metal, alkaline earth metal or ammonium salts thereof, and optionally at least one of (b) and (c), where
(b) comprise monoethylenically unsaturated monomers other than the monomers (a) and copolymerizable with the monomer (a), and where
(c) comprise monomers having at least two ethylenically unsaturated, nonconjugated double bonds in the molecule,
in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds.

The process in this case may in principle also comprise further process steps known fundamentally to the skilled person in a leathermaking context, without departing the scope of the invention. Examples of such further optional process steps include, for instance, soaking, splitting, bating, shaving, dyeing, drying, but without being limited to these. These steps as well can be carried out in a manner known to the skilled person.

As described above, it is possible through the use of the deliming agent to achieve significant advantages in terms of environmental and economic considerations.

The further process steps described, such as more particularly the liming or the tanning, may also be carried out in principle in a manner known per se.

The liming of hides in order to unhair the hide and open it up, for instance to remove unwanted proteins, as part of leathermaking takes place in particular in an alkaline medium, usually by means of inorganic or else organic sulfides at a pH of 12 or higher. The alkaline agent used is normally lime, generally on its own, but occasionally also in a mixture with sodium hydroxide solution or soda. In principle, however, liming is known to the skilled person.

This is then followed by the deliming as described above.

Subsequent to the deliming, tanning may then take place.

The tanning as well can be carried out in a manner known per se. In a fundamentally known way, tanning is understood to be the process of preserving the animal hide, with or without hairs, by means of tanning agents. During tanning, the tanning agents enter into a chemical bond with the fibrous microstructure of the animal hide, which prevents the fibrous microstructure of the hide from hardening and decaying and provides the animal hide with long-term stabilization and/or protection from oxidation and/or rotting. In this context, in principle any kind of tanning may be encompassed by the process described here. Illustrative tanning agents comprise, for example, in the case of chrome tanning, 33% basic chromium sulfate used with a chromium (III) oxide content of about 26%. This has the advantage, for instance, that the use of chromium(III) salts is deemed to have no harmful health effects and in the great majority of people not to raise any difficulties at all in spite of intense skin contact in the footwear or clothing area.

In particular, the tanning may be free from the graft polymers as are described above with reference to the deliming process or the deliming composition. It is, however, also possible for the tanning to be carried out with the above-described graft polymers.

With reference to further advantages and technical features of the process for producing leather, reference is made to the observations concerning the deliming composition, the deliming process, the use and the examples, and vice versa.

In line with the above, a subject of the present invention is additionally the use of an above-described graft polymer and therefore for instance of a deliming composition as described above and/or of a deliming process as described above for deliming hides.

Such use provides distinct advantages from the standpoints of economics and environment.

With reference to further advantages and technical features of the use, reference is made to the observations concerning the deliming composition, the process for producing leather, the deliming process, and the examples, and vice versa.

In line with the above, a subject of the present invention additionally is a leather and also an intermediate in leathermaking, delimed using a graft polymer. The graft polymer is characterized in that it comprises a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or suchlike chemically modified degraded products or chemically modified mono-, oligo- or polysaccharides and wherein the derivatives of the polypeptides are hydrolytically or enzymatically degraded and optionally chemically modified polypeptides, the graft polymer being obtainable by radical polymerization of A) a monomer selected from or a monomer mixture of
  (a) acrylic acid or methacrylic acid or a mixture thereof or the alkali metal, alkaline earth metal or ammonium salts thereof, and optionally at least one of (b) and (c), where
  (b) comprise monoethylenically unsaturated monomers other than the monomers (a) and copolymerizable with the monomer (a), and where
  (c) comprise monomers having at least two ethylenically unsaturated, nonconjugated double bonds in the molecule,
  in the presence of at least one of B1) polysaccharides, oxidatively, hydrolytically or enzymatically degraded polysaccharides, oxidized hydrolytically degraded or oxidized enzymatically degraded polysaccharides or suchlike chemically modified degraded products, chemically modified mono-, oligo- or polysaccharides, or mixtures of the specified compounds, and B2) polypeptides, hydrolytically or enzymatically degraded and optionally chemically modified polypeptides, or mixtures of the specified compounds.

A leather of this kind or a leathermaking intermediate of this kind affords distinct advantages from the standpoints of economics and environment in relation to its production.

The intermediate may be in particular here be an intermediate obtained directly through the deliming and having not yet been tanned. For example, the delimed and as yet untanned intermediate may still be present in a solution comprising the graft polymer.

The leather may be a ready-produced leather.

With reference to further advantages and technical features of the leather and of the intermediate, reference is made to the observations concerning the use, the deliming composition, the process for producing leather, the deliming process, and the examples, and vice versa.

EXAMPLES

The invention is elucidated in more detail with the following examples, without any intention thereby to limit the invention.

Preparation of the Graft Polymers

The protein hydrolysate used in the examples which follow originates from a commercially operated plant for the basic processing of shavings of cattle hide having undergone chrome or chromium-free tanning, producing in the first case a chromium-containing and in the second case a chromium-free protein hydrolysate. In the case of the chromium-containing protein hydrolysate, the protein hydrolysate was filtered prior to use, in order to separate the solid chromium residue from the liquid, protein-containing filtrate. (The protein hydrolysate may possess a mean molecular weight of between around 1000 daltons and 8000 daltons, preferably in a range of between 2000 daltons and 3000 daltons).

The starch hydrolysate used likewise comes from a commercially operated plant for the basic/enzymatic processing of wheat flour. (The starch hydrolysate possesses a molecular weight of around 3000 daltons).

An advantage of such molecular weights is, in particular, a possible low degree of hydrolysis.

General Graft Polymerization Protocol

The appropriate amount of protein hydrolysate 40 wt % (in water) and the appropriate amount of starch hydrolysate 40 wt % (in water) were placed into a 1 liter reactor. The contents of the reactor were heated to 88-92° C. with stirring and the appropriate amount of hydrogen peroxide (30%, amount 1) was added to the mixture, which was stirred for 15 min. Subsequently an aqueous solution of ammonium persulfate (10%), the appropriate amount of 70% acrylic acid (prepared by diluting acrylic acid (98%) with the appropriate amount of water) and the appropriate amount of hydrogen peroxide (30%, amount 2) were added. After a reaction time of 30 min., further hydrogen peroxide (30%, amount 3) was added and the mixture was stirred for 2 hours more at 88-92° C. When the reactor contents have cooled to 40° C., 500% sodium hydroxide solution was added slowly with stirring, taking care to ensure that the temperature in the reactor was held below 60° C., until a pH between 4-5 was attained. The end product was obtained by cooling the reactor to room temperature with stirring, and biocides were added and mixed in thoroughly.

P1) Graft Polymer 1

According to general graft polymerization protocol 1

| Material | Amount [g] |
| --- | --- |
| Protein hydrolysate (Source: hydrolysis of chromium-free shavings) | 620.5 |
| Starch hydrolysate | 142.6 |
| Hydrogen peroxide (amount 1) | 1.0 |
| Ammonium persulfate solution | 6 |
| Acrylic acid | 42.6 |
| Hydrogen peroxide (amount 2) | 2.0 |
| Hydrogen peroxide (amount 3) | 2.0 |

P2) Graft Polymer 2

According to general graft polymerization protocol

| Material | Amount [g] |
| --- | --- |
| Protein hydrolysate (Source: hydrolysis of chromium-free shavings) | 620.5 |
| Starch hydrolysate | 142.6 |
| Hydrogen peroxide (amount 1) | 2.5 |
| Ammonium persulfate | 15 |
| Acrylic acid | 106.43 |
| Hydrogen peroxide (amount 2) | 5.0 |
| Hydrogen peroxide (amount 3) | 5.0 |

P3) Graft Polymer 3

According to general graft polymerization protocol

| Material | Amount [g] |
| --- | --- |
| Protein hydrolysate (Source: hydrolysis of chromium-containing shavings) | 770.2 |
| Starch hydrolysate | 0 |
| Hydrogen peroxide (amount 1) | 1.0 |
| Ammonium persulfate solution | 6 |
| Acrylic acid | 42.6 |
| Hydrogen peroxide (amount 2) | 2.0 |
| Hydrogen peroxide (amount 3) | 2.0 |

P4) Graft Polymer 4

According to general graft polymerization protocol

| Material | Amount [g] |
| --- | --- |
| Protein hydrolysate (Source: hydrolysis of chromium-free shavings) | 620.5 |
| Starch hydrolysate | 142.6 |
| Hydrogen peroxide (amount 1) | 0.5 |
| Ammonium persulfate solution | 3 |
| Acrylic acid | 21.3 |
| Hydrogen peroxide (amount 2) | 1.0 |
| Hydrogen peroxide (amount 3) | 1.0 |

P5) Graft Polymer 5

According to general graft polymerization protocol 1

| Material | Amount [g] |
| --- | --- |
| Protein hydrolysate (Source: hydrolysis of chromium-containing shavings) | 620.5 |
| Starch hydrolysate | 142.6 |
| Hydrogen peroxide (amount 1) | 1.0 |
| Ammonium persulfate solution | 6 |
| Acrylic acid | 42.6 |
| Hydrogen peroxide (amount 2) | 2.0 |
| Hydrogen peroxide (amount 3) | 2.0 |

P6) Graft Polymer 6

According to general graft polymerization protocol 1

| Material | Amount [g] |
| --- | --- |
| Protein hydrolysate | 156.1 |
| Starch hydrolysate | 565.3 |
| Hydrogen peroxide (amount 1) | 0.5 |
| Ammonium persulfate solution | 3 |
| Acrylic acid | 21.3 |
| Hydrogen peroxide (Amount 2) | 1.0 |
| Hydrogen peroxide (Amount 3) | 1.0 |

APPLICATIONAL EXAMPLES USING THE GRAFT POLYMERS

Application Example 1: Ammonium-Free Deliming with Graft Polymer 1

The starting material used comprises pelts (cattle) split downstream of the liming facility and weighed, with a thickness of around 3.5 mm. All usage amounts below for chemicals are based on this reference weight (spelt weight).

After customary preparatory work with which the skilled person is familiar, the limed pelts are washed with 150% of water. Then 30% of water, 0.3% of sodium hydrogen sulfite and 0.3% of Peltec DL (dicarboxylic acid mixture, commercial product from Lanxess) are added. After 15 min., 5% of the graft polymer from example 1 is added and is left to act until the cross section of the hide no longer shows any coloration with the pH indicator phenolphthalein (pH<8.2). Table 1 sets out the process steps of the process of the invention with the subsequent steps of bating and tanning for the production of leather intermediates (the wt % is based on the pelt weight).

TABLE 1

| Operating step | Wt % | Chemicals | Rum time [min] | Comments |
| --- | --- | --- | --- | --- |
| Washing | 150 | Water 32° C. | 15' | Drain off liquor |
| Deliming | 30 | Water 32° C. | | |
| | 0.3 | Sodium hydrogen sulfite | | |
| | 0.3 | Peltec DL | 15 | |
| | 5.0 | Graft polymer | 120 | Hide cross section with phenolphthalein: colorless |
| Bating | 0.15 | PELTEC ADN | | |
| | 0.3 | Peltec BG | 60' | |
| | | | | Drain off liquor |
| Tanning | 50 | Water 20° C. | | |
| | 6.0 | Sodium chloride | 5' | |
| | 0.5 | Formic acid | 10' | |
| | 0.8 | Sulfuric acid | 90' | pH 3.4 |
| | 5.5 | Chromosal B | 30' | |
| | 0.1 | Preventol U-Tec G | 30' | |
| | 0.5 | BLANCOROL BA - I | 480' | Automatic unit 40° C. Drain off liquor |

After the process of the invention, the leather intermediates are stored on a horse, sammed and shaved, and are thereafter worked further by a customary method to give finished crust leathers. These crust leathers are then assessed for quality.

Application Example 2: Ammonium-Free Deliming with Graft Polymer 2

As example 1, only with 5% of graft polymer 2

Application Example 3: Ammonium-Reduced Deliming with Graft Polymer 3

As example 1, except that before the addition of 2.5% of graft polymer 3, 0.50% of Peltec DLA (mixture of ammonium salts, commercial product from Lanxess AG) was added

Application Example 4: Ammonium-Reduced Deliming with Graft Polymer 4

As example 1, except that before the addition of 2.5% of graft polymer 4, 0.5%0 of Peltec DLA (mixture of ammonium salts, commercial product from Lanxess) was added.

Application Example 5: Ammonium-Reduced Deliming with Graft Polymer 5

As example 1, except that before the addition of 2.5% of graft polymer 5, 0.5% of Peltec DLA (mixture of ammonium salts, commercial product from Lanxess) was added.

Application Example 6: Ammonium-Reduced Deliming with Graft Polymer 6

As example 1, except that before the addition of 2.5% of graft polymer 6, 0.5% of Peltec DLA (mixture of ammonium salts, commercial product from Lanxess) was added.

Comparative Example 1: Deliming with Ammonium Salts

As example 1, except that instead of a graft polymer, 2.0% of Peltec DLA (mixture of ammonium salts, commercial product from Lanxess) was added

TABLE 2

| Example | NH₄ salt | pH during deliming | | | Penetration time | NH₄ N fraction [ppm] |
|---|---|---|---|---|---|---|
| | | 30 min | 60 min | 120 min | | |
| 1 | free | 6.9 | 8.5 | 8.8 | 120 | 220 |
| 2 | free | 6.3 | 7.5 | 8.3 | 120 | 200 |
| 3 | red. | 7.6 | 8.3 | 8.5 | 75 | 990 |
| 4 | red. | 6.9 | 8.7 | 8.8 | 75 | 1075 |
| 5 | red. | 8.0 | 8.5 | 8.7 | 75 | 1090 |
| 6 | red. | 8.4 | 8.7 | 8.8 | 75 | 1020 |
| Comparative example 1 | — | 8.2 | 8.3 | 8.3 | 75 | 4300 |

As set out in table 2, in the deliming with the graft polymers alone or using an amount of ammonium salts reduced relative to the comparative example, the pH attained after no later than 60 min was similar to that of the comparative example with deliming solely by means of ammonium salts. While the pH after 30 min is indeed somewhat lower in certain cases, it is far removed from the pH of around 5 that is to be avoided (isoelectric point of protein) and from the associated quality problems in the finished crust leathers. This indicates the good buffer effect of the substances. The similar pH of around 8.5 at the end of the operation means that the graft polymers have just as good an ability to neutralize the cross section of the hide as the ammonium salts.

In any case, when using graft polymers, whether in the ammonium salt-free or ammonium salt-reduced process, the ammonium nitrogen value in the wastewater is significantly reduced.

The value of around 4300 ppm for an ammonium salt-containing deliming is lowered with the ammonium salt-free process to a value of around 200 ppm and in the ammonium salt-reduced process to around 1000 ppm. This implies a reduction in the ammonium content in the wastewater by 95% in the 1ˢᵗ case and 75% for the 2ⁿᵈ case in comparison to an ammonium salt-containing deliming.

In the case of ammonium salt-free processes, the penetration times are indeed somewhat longer by comparison with ammonium salt-containing deliming, but are still at an acceptable level to the practitioner. Through the accompanying use of a greatly reduced amount of ammonium salt together with the graft polymers, the operating time becomes more similar. Evident from examples 3-6.

All of the crust leathers obtained, produced from the hides obtained in examples 1-6, have a uniform color, a soft hand, and a very fine grain, comparable with that from the comparative example.

The invention claimed is:

1. A deliming composition for deliming hides, the deliming composition comprises:
a hide for deliming; and
a deliming agent, the deliming agent comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or chemically modified mono-, oligo- or polysaccharides and wherein the derivatives of the polypeptides are hydrolytically or enzymatically degraded polypeptides, the graft polymer being obtainable by radical polymerization of
A) a monomer selected from or a monomer mixture of
(a) acrylic acid or methacrylic acid or a mixture thereof or alkali metal, alkaline earth metal or ammonium salts thereof, and at least one of (b) and (c), where
(b) comprises monoethylenically unsaturated monomers other than the monomers (a) and copolymerizable with the monomer (a), and where
(c) comprises monomers having at least two ethylenically unsaturated, nonconjugated double bonds in the molecule,
in the presence of at least one of
B1) polysaccharides, oxidatively, hydrolytically or enzymatically degraded polysaccharides, oxidized hydrolytically degraded or oxidized enzymatically degraded polysaccharides, chemically modified mono-, oligo- or polysaccharides, or mixtures thereof, and
B2) polypeptides, hydrolytically or enzymatically degraded polypeptides, or mixtures thereof.

2. The deliming composition as claimed in claim 1, wherein characterized in that the monomer A is free from the monomers (b) and (c).

3. The deliming composition as claimed in claim 1, wherein the monomer mixture of the monomer A) comprises:
(a) acrylic acid or methacrylic acid or a mixture thereof or the alkali metal, alkaline earth metal or ammonium salts thereof, and at least one of (b) and (c), where
(b) comprises monoethylenically unsaturated monomers other than the monomers (a) and copolymerizable with the monomer (a), and where
(c) comprises monomers having at least two ethylenically unsaturated, nonconjugated double bonds in the molecule.

4. The deliming composition as claimed in claim 1, wherein the graft polymer is obtainable by radical polymerization of
A) a monomer selected from or a monomer mixture of
(a) 20 to 100 wt % of acrylic acid or methacrylic acid or a mixture thereof or the alkali metal, alkaline earth metal or ammonium salts thereof, based on the monomer A,
(b) 0 to 80 wt % of other monoethylenically unsaturated monomers which are copolymerizable with the monomer (a), based on the monomer A, and
(c) 0 to 5 wt % of monomers having at least two ethylenically unsaturated, nonconjugated double bonds in the molecule, based on the monomer A, in the presence of at least one of
B1) polysaccharides, oxidatively, hydrolytically or enzymatically degraded polysaccharides, oxidized hydrolytically degraded or oxidized enzymatically degraded polysaccharides, chemically modified mono-, oligo- or polysaccharides, or mixtures thereof, and
B2) polypeptides, hydrolytically or enzymatically degraded polypeptides, or mixtures thereof.

5. The deliming composition as claimed in claim 1, wherein the graft polymer is obtainable by radical polymerization of acrylic acid, polypeptide hydrolysate and polysaccharide hydrolysate.

6. The deliming composition as claimed in claim 1, wherein the polysaccharides B1) have a mean molecular weight in a range of 500-10000 daltons.

7. The deliming composition as claimed in claim 1, wherein the polysaccharides B1) comprise hydrolytically degraded starch.

8. The deliming composition as claimed in claim 1, wherein the polypeptides B2) have a mean molecular weight in a range of greater than or equal to 1000 daltons.

9. The deliming composition as claimed in claim 1, wherein the polypeptides B2) comprise worked-up shavings of cattle hide having undergone chrome or chromium-free tanning.

10. A deliming process for deliming a hide for deliming, the deliming process comprises the following process steps:

a) providing a hide for deliming; and b) treating the hide for deliming with a deliming agent, the deliming agent comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or chemically modified mono-, oligo- or polysaccharides and wherein the derivatives of the polypeptides are hydrolytically or enzymatically degraded polypeptides, the graft polymer being obtainable by radical polymerization of A) a monomer selected from or a monomer mixture of (a) acrylic acid or methacrylic acid or a mixture thereof or the alkali metal, alkaline earth metal or ammonium salts thereof, and at least one of (b) and (c), where (b) comprises monoethylenically unsaturated monomers other than the monomers (a) and copolymerizable with the monomer (a), and where (c) comprises monomers having at least two ethylenically unsaturated, nonconjugated double bonds in the molecule, in the presence of at least one of B1) polysaccharides, oxidatively, hydrolytically or enzymatically degraded polysaccharides, oxidized hydrolytically degraded or oxidized enzymatically degraded polysaccharides, chemically modified mono-, oligo- or polysaccharides, or mixtures thereof, and B2) polypeptides, hydrolytically or enzymatically degraded and optionally chemically modified polypeptides, or mixtures thereof.

11. The deliming process as claimed in claim 10, wherein in process step b) the deliming agent is present in a fraction of ≥0.5 wt % to ≤12 wt %, based on an amount of the hide for deliming.

12. A process for producing leather, comprising the process steps of:

i) providing a raw hide;

ii) liming or painting the raw hide;

iii) deliming the raw hide; and iv) tanning the raw hide, wherein the deliming of the raw hide in process step iii) is carried out using a deliming agent which comprises a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides er chemically modified mono-, oligo- or polysaccharides and wherein the derivatives of the polypeptides are hydrolytically or enzymatically degraded polypeptides, the graft polymer being obtainable by radical polymerization of A) a monomer selected from or a monomer mixture of (a) acrylic acid or methacrylic acid or a mixture thereof or the alkali metal, alkaline earth metal or ammonium salts thereof, and at least one of (b) and (c), where (b) comprises monoethylenically unsaturated monomers other than the monomers (a) and copolymerizable with the monomer (a), and where (c) comprises monomers having at least two ethylenically unsaturated, nonconjugated double bonds in the molecule, in the presence of at least one of B1) polysaccharides, oxidatively, hydrolytically or enzymatically degraded polysaccharides, oxidized hydrolytically degraded or oxidized enzymatically degraded polysaccharides, chemically modified mono-, oligo- or polysaccharides, or mixtures thereof, and B2) polypeptides, hydrolytically or enzymatically degraded polypeptides, or mixtures thereof.

13. A leathermaking intermediate delimed with a graft polymer, the graft polymer comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or chemically modified mono-, oligo- or polysaccharides and wherein the derivatives of the polypeptides are hydrolytically or enzymatically degraded and polypeptides, the graft polymer being obtainable by radical polymerization of A) a monomer selected from or a monomer mixture of (a) acrylic acid or methacrylic acid or a mixture thereof or the alkali metal, alkaline earth metal or ammonium salts thereof, and optionally at least one of (b) and (c), where (b) comprises monoethylenically unsaturated monomers other than the monomers (a) and copolymerizable with the monomer (a), and where (c) comprises monomers having at least two ethylenically unsaturated, nonconjugated double bonds in the molecule, in the presence of at least one of B1) polysaccharides, oxidatively, hydrolytically or enzymatically degraded polysaccharides, oxidized hydrolytically degraded or oxidized enzymatically degraded polysaccharides, chemically modified mono-, oligo- or polysaccharides, or mixtures thereof, and B2) polypeptides, hydrolytically or enzymatically degraded polypeptides, or mixtures thereof the specified compounds.

14. A leather delimed with a graft polymer, the graft polymer comprising a graft polymer of at least one of polysaccharides, polypeptides or derivatives thereof, wherein the derivatives of polysaccharides are oxidatively, hydrolytically or enzymatically degraded polysaccharides, oxidized hydrolytically degraded or oxidized enzymatically degraded polysaccharides or chemically modified mono-, oligo- or polysaccharides and wherein the derivatives of the polypeptides are hydrolytically or enzymatically degraded polypeptides, the graft polymer being obtainable by radical polymerization of A) a monomer selected from or a monomer mixture of (a) acrylic acid or methacrylic acid or a mixture thereof or the alkali metal, alkaline earth metal or ammonium salts thereof, and at least one of (b) and (c), where (b) comprises monoethylenically unsaturated mono-
mers other than the monomers (a) and copolymer-
izable with the monomer (a), and where (c) comprises monomers having at least two ethyleni-
cally unsaturated, nonconjugated double bonds in the
molecule, in the presence of at least one of B1) polysaccharides, oxidatively, hydrolytically or enzy-
matically degraded polysaccharides, oxidized hydro-
lytically degraded or oxidized enzymatically degraded
polysaccharides, chemically modified mono-, oligo- or
polysaccharides, or mixtures thereof, and B2) polypeptides, hydrolytically or enzymatically
degraded polypeptides, or mixtures thereof.

* * * * *